(12) United States Patent
Beck

(10) Patent No.: US 7,322,262 B2
(45) Date of Patent: Jan. 29, 2008

(54) METHOD FOR MANUFACTURING BARBER SCISSORS, AND BARBER SCISSORS

(75) Inventor: Christian Beck, Drei-Kreuz-Strasse 6, 78597 Irndorf (DE)

(73) Assignees: Christian Beck, Irndorf (DE); TIM Tuttlinger-Instrumenten-Manufaktur GmbH, Tuttlingen (DE)

( * ) Notice: Subject to any disclaimer, the term of this patent is extended or adjusted under 35 U.S.C. 154(b) by 197 days.

(21) Appl. No.: 10/531,688

(22) PCT Filed: Oct. 15, 2003

(86) PCT No.: PCT/EP03/11447

§ 371 (c)(1),
(2), (4) Date: Apr. 15, 2005

(87) PCT Pub. No.: WO2004/035242

PCT Pub. Date: Apr. 29, 2004

(65) Prior Publication Data

US 2005/0241440 A1 Nov. 3, 2005

(30) Foreign Application Priority Data

Oct. 15, 2002 (DE) ............................... 102 48 026

(51) Int. Cl.
*B21K 11/00* (2006.01)
(52) U.S. Cl. ................................................... 76/106.5
(58) Field of Classification Search ............... 76/82.2, 76/104.1, 106.5; 30/29, 194, 225, 350, 357
See application file for complete search history.

(56) References Cited

U.S. PATENT DOCUMENTS

| 1,814,959 | A | * | 7/1931 | Parker ......................... 30/349 |
| 2,041,345 | A | * | 5/1936 | Jaques ....................... 76/104.1 |
| 2,776,482 | A | * | 1/1957 | Hafekost ..................... 30/230 |
| 2,795,225 | A | * | 6/1957 | Sovatkin et al. ............ 606/147 |
| 3,827,316 | A | * | 8/1974 | Laurenti .................... 76/106.5 |
| 4,007,524 | A | * | 2/1977 | Hannes et al. ............... 30/266 |
| 5,069,872 | A | * | 12/1991 | Penoza ....................... 420/436 |

FOREIGN PATENT DOCUMENTS

DE           32 19 260 A        11/1983

(Continued)

*Primary Examiner*—M. Rachuba
(74) *Attorney, Agent, or Firm*—Oliff & Berridge, PLC

(57) ABSTRACT

The invention relates to a method for manufacturing barber scissors (1), wherein the scissor blades (23, 33) are pre-shaped from blanks by a predetermined degree of curvature in the direction facing away from the edge. This is followed by a step of welding on a hard metal material in the form of a welding bead on respective mutually facing faces of the scissor blades (23, 33) in order to form the edges (24, 34), wherein the preliminary curvature of the scissor blades (23, 33) is neutralized owing to the influence of heat during the welding process. Subsequently the welding beads are ground so as to form the edges (24, 34), and the scissor halves (2, 3) are pre-set and hardened. Then the barber scissors (1) are hard-set in the assembled condition. The invention furthermore relates to barber scissors (1) having such a configuration. Here the edges (24, 34) are present as massive material over the entire thickness of the scissor blades (23, 33), so that even severally repeated re-grinding or re-setting of the barber scissors (1) is possible without any loss of functionality.

7 Claims, 2 Drawing Sheets

FOREIGN PATENT DOCUMENTS

| | | | |
|---|---|---|---|
| DE | 3219260 A1 * | 11/1983 |
| DE | 197 33 035 A1 | 2/1999 |
| DE | 199 09 887 A | 10/1999 |
| EP | 0 156 395 A | 10/1985 |
| EP | 156395 A2 * | 10/1985 |
| JP | A 60-212187 | 10/1985 |
| JP | 05146558 * | 6/1993 |
| JP | A-2002-200529 | 7/2002 |

* cited by examiner

METHOD FOR MANUFACTURING BARBER SCISSORS, AND BARBER SCISSORS

The invention concerns a method for manufacturing barber scissors in accordance with Claim 1.

Scissors conventionally are comprised of two scissor halves articulately interconnected through the intermediary of a lock, with the two scissor halves, and thus also the edges, frequently being formed of stainless or stain-resistant steel alloys. Such scissors do, however, present the drawback of losing their sharpness in the range of the edges after a relatively short period of use. For this reason it is also known to apply hard metal layers in the range of the edges. Hereby the lifetime of the scissors may be extended substantially, with the edge preserving its sharpness longer thanks to the strength of the hard metal. On the other hand, however, hard metal is relatively brittle, which is the reason why the production step for setting the barber scissors is more difficult to perform than with conventional scissor blades of steel alloys. Excessively intense processing and the resulting deformation may result in cracks and chipping at the edge. On the other hand, uniformity of movement and smoothness of the two scissor parts depend on optimum mutual setting of the scissor blades. If hard metal is at all employed for the edges, it is therefore preferred in practice to concentrate this material in the range of the edges.

In addition, various types of scissors are known in practice, each of which are based on the same fundamental principle, however are subject to clearly distinct requirements depending on their application. Thus it is substantially of importance in the case of a conventional pair of household scissors that they may be provided at low cost and sever paper, cloth, etc. with satisfactory results. Apart from this there are, for example, also surgical scissors whereby specific cuts are possible even in hard-to-cut body tissue in the course of a surgical intervention. To this end, these scissors customarily comprise long shanks with short edges so as to obtain favorable conditions of leverage, and are moreover formed of materials that are particularly corrosion resistant and also endure sterilization processes. From practical use, surgical scissors are moreover known where hard metal edges are joined to the scissor blades, or hard metal platelets constituting hard metal edges are attached at the scissor blade in order to ensure the cutting properties even with hard or resistant organic materials, in particular also over the entire duration of one or several surgical operations. The use of hard metal edges has found good acceptance in this field, particularly due to the fact that surgical scissors are subject to very high fretting corrosion in the range of the edges, for the scissors must not be oiled following sterilization for reasons of hygiene. As it is, however, only sparsely necessary to place cuts in surgery, the unfavorable frictional conditions at the edges of the like surgical scissors are only of minor importance in practice also with a view to the favorable leverage conditions.

In the case of barber scissors, in contrast, easy movement of the scissors is of eminent importance, for they represent the essential working tool for a hairdresser. They are massively utilized in the course of one workday, and hundreds or even thousands of single cuts must be carried out with them day in, day out. In order to allow for agreeable working with such barber scissors, even in the light of the high cutting frequencies, their scissor blades should be set with particular precision and designed for low friction, so that the effort implied for each single cutting process may be kept low.

To this end it is in particular known in practice to cross the scissor blades in such a way that the two edges will with maximum accuracy always contact each other in precisely one point when a cut is performed, with this point of contact progressively migrating to the front tip of the scissors while the scissor halves are being closed. Such crossing of the scissor blades is achieved by a torsion thereof about their longitudinal axes on the one hand, and by bending them towards each other on the other hand. This setting of conventional barber scissors is carried out in the hardened and locked condition, with the smooth movement of the two edges being influenced and optimized through gentle hammer strokes. There are, however, limits to this manner of proceeding, as well, for the edge tends to become damaged if worked too strongly with the resulting deformation. There are accordingly limits to an optimization of homogeneity of movement and to the easy movement of the two scissor parts in conventional barber scissors.

In addition, barber scissors thus formed may only be manufactured with high complexity, for which reason they are very expensive. They are moreover also very sensitive, for even a single drop on the floor may result in a deformation of the scissor blades, which will bring about a massive impairment of the moving properties of the two edges even in the case of a slight deformation. Manipulation of the barber scissors will then become considerably more difficult, so that as a general rule they will be made useless even after one such impact due to an impaired precision and movement and accuracy.

One example for barber scissors with hard metal edges may be found in DE 199 09 887 A1. The hard metal is here applied as a layer on a base material by a thermal spraying method and subsequently ground so as to obtain the slide face and the shear edge. As a result of the application of such a wear-reducing layer of hard metal, the edges are not so sensitive to wear and will not blunt as quickly as conventional barber scissors. In the long run they therefore exhibit reduced resistance upon closing of the scissors, so that the effort required from the user will equally be permanently low. Such barber scissors equipped with hard metal edges even allow to cut other materials such as paper or the like, without losing the cutting performance on hair.

A deformation owing to mechanical influences such as, e.g., a drop of the barber scissors on the floor does, however, in the case of the barber scissors with hard metal edges as known from DE 199 09 887 A1 have the result that it will as a general rule not be usable any more, for the connection of the sprayed-on hard metal layer with the base body does not have sufficient stability to allow for post-processing. Where the hard metal layer is not already broken away due to the impact, the mechanical action during renewed setting of the edges of these barber scissors mostly causes the hard metal layer to chip off.

The insufficient adhesion of the sprayed-on hard metal layer on the base body is also the reason why even the first setting of these conventional barber scissors is problematic. It is necessary to proceed with utmost care in order to limit the percentage of refuse. For this reason, a reduced quality of the final product is commonly accepted in order to keep the production costs as a whole within an acceptable frame.

It is another drawback of the hard metal-coated barber scissors in accordance with DE 199 09 887 A1 that resharpening of the edges by grinding as a general rule is at best only possible once, for the applied material is removed in the process, with the edge subsequently again only be constituted of the less suitable carrier material.

The invention is therefore based on the object of furnishing a method permitting the manufacture of easy-moving barber scissors having a long lifetime and high mechanical strength, with the possibility of repeated subsequent sharpening of the shear edge. Moreover it is intended to furnish such barber scissors.

This object is attained in terms of method through the features in accordance with Claim 1.

The method of the invention for manufacturing barber scissors in accordance with Claim 1 provides the following steps: furnishing one blank each for scissor halves of the barber scissors, with the scissor halves each comprising a scissor blade, a shank, and a ring, pre-shaping the scissor blades by a predetermined degree of curvature in the direction facing away from the edge, welding on a hard metal material in the form of a welding bead on the respective mutually facing faces of the scissor blades in order to form the hard metal layers for the edges, wherein the predetermined pre-forming of the scissor blades is substantially neutralized owing to the influence of heat during the welding process, grinding of the welding beads so as to form the edges, combining and subsequently setting the scissor halves, disassembly and subsequent hardening of the scissor halves, surface treatment of the scissor halves, again combining the scissor halves, and hard-setting the barber scissors.

Here it was realized in accordance with the invention that despite the high quality demands to the scissor blades of barber scissors, it is possible to apply the material for the edges by welding on a hard metal material, or hard-facing, if the deformation of the blank due to the thermal influence during the welding process is specifically taken into consideration. In accordance with the invention this is achieved by the pre-shaping of the scissor blades, wherein it is possible to reliably perform such pre-setting, for the weld is applied on the full surface on the front side of the scissor blade, resulting in a heat flux and thus in a curvature in only one direction. The curving behavior of the blank under the thermal influence during the welding process may thus be predetermined well. This pre-forming is substantially neutralized in the following welding step, so that substantial stresses will not remain within the material of the scissor blades, and the edges nevertheless will have a suitable relative arrangement in the cooled condition of the scissor halves while allowing their formation by grinding of the scissor blades. The scissor blades thus formed accordingly have edges which extend over the entire thickness of the scissor blades and are formed as massive elements. It is therefore possible to carry out even severally repeated sharpening of the edge by grinding.

The barber scissors in accordance with the invention accordingly keep their sharpness over a long period or may be resharpen while moving very easily, for such hard metals produce little friction running on each other. In particular it is also possible with the barber scissors of the invention to grind the edges to a very acute angle, resulting in a razor-sharp edge where this is desired. In the case of edges of softer materials the tip of the cutting angle is subject to very high wear, resulting in a rapidly reduced sharpness, whereas in accordance with the invention, by using a hard metal edge of the barber scissors formed of massive material, it is possible to reliably prevent the chipping off of a tiny piece when the edges run against each other. In conventional barber scissors this habitually results in their becoming useless, for the faulty location will damage the opposite edge due to the created recess or irregularity. This set of problems may be avoided with the barber scissors of the invention that include hard metal edges.

Furthermore the barber scissors of the invention are characterized in that the edge is subject to low wear, resulting in prolonged durability at an identical cutting performance. Moreover the continuous hard metal layer is also prone to corrosion in a lesser degree, which equally improves its durability. It is therefore also possible to cut foreign materials without a loss of cutting properties. These may even be thin wires, paper, or similar materials, for unevennesses or damages at the edge may be avoided thanks to the continuous hard metal material, or be remedied by regrinding and optionally by resetting.

It is moreover particularly advantageous in the technique in accordance with the invention that thanks to the welding process, a particularly good and reliable connection is produced, for in the range of the weld there results a kind of alloy of the base material fused with the hard metal material. Hereby mechanical as well as thermal stresses in the material may be avoided, or a more homogeneous transition between the combined materials may be produced. Chipping of an edge from the scissor blade may thus reliably be precluded, so that particularly accurate setting and fine trimming of the edges is possible even by hammer strokes. Should this become necessary, for instance after the scissors fell to the ground, barber scissors may therefore readily be reset altogether.

It is another advantage of the method in accordance with the invention that the welding bead, or the edge ground on at least two sides, may be examined with a view to possible pores in the hard metal or other welding defects. Such deficiencies may therefore be recognized better, so that it is possible to guarantee a substantially higher product quality.

Moreover the degree of pre-curving for the pre-forming of the scissor blades may be determined with relatively low complexity, in which context it is possible, for instance, to carry out test welds on blanks for each batch. This is based on the consideration that the degree of deformation may vary slightly between batches, and it is possible to obtain corresponding values of experience with low technical expenditure. Once pre-forming has been determined in a series of a scissors type of the invention, this value may be transferred to the remaining scissor parts of this batch of blanks.

The method of the invention may thus be performed with high reliability and relatively low technical expenditure. In particular it is thereby possible to manufacture barber scissors having particularly advantageous properties.

Advantageous developments of the method of the invention are subject matter of dependent Claims 2 to 7.

Thus the blank of a scissors half may already be formed such that the hard metal material may be applied directly onto the mutually facing faces of the scissor blades. As an alternative it is, however, also possible in accordance with Claim 2 to perform a removal of material on the scissor blades prior to their pre-forming on the mutually facing faces, on which the edges are to be formed. This removal of material may readily be accomplished by grinding or milling and produces an improved base for the welding bead of hard metal material to be applied thereon. The method of the invention may thereby be performed with even higher reliability and quality safety.

For welding on the hard metal material in particular a TIG (tungsten inert gas) welding process has found acceptance in practical testing, for hereby a good connection and a high-quality welding bead may be produced. Besides this, however, another inert gas welding process may equally be applied.

If welding on of the hard metal material is performed with the aid of a cooled clamping device, the process may be controlled even more accurately, whereby it is possible to avoid an impairment by the thermal influence particularly of the carrier material of which the scissor blades are formed, and the heat fluxes may be controlled better.

Furthermore it is also possible that hard-setting of the barber scissors encompasses a pre-setting by means of hammer blows. This method, which is already known per se and found acceptance in practice for conventional barber scissors, has moreover—contrary to the bad experiences with—on hard metal layers—shown itself to be advantageous for welded-on hard metal edges of massive material, as was found in practical tests performed by the present applicant. In this way a good and regular movement of the two edges is made possible with relatively low complexity in production technology.

Due to the fact that the surface treatment of the scissor halves includes a fine grinding in one step or in several steps, with the insides of the scissor blades and of the edges being worked on a cork disc while using a polishing powder and a polishing paste, easy movement of the barber scissors manufactured by this method may again be improved substantially. The two scissor blades slide even more easily on each other, whereby the effort for cutting may be further reduced. Here it is possible to progressively approach the optimum of easy movement of the scissors by the minute removal of material, which is not possible in the conventional machining method, particularly in the case of hard metal-coated scissors.

It is furthermore advantageous if the surface treatment of the scissor halves includes matting of the insides of the scissor blades and of the edges by means of a Scotch disc. Minor grinding traces possibly still existing after the fine grinding step, which may even be felt in the movement of the scissors, may thus be removed and reduced to such a degree that they cease to influence a smooth movement of the scissors. Furthermore it is hereby also possible to obtain an enhanced corrosion strength of the surface.

In accordance with another aspect of the present invention, barber scissors. They are in particular manufactured by a method in accordance with one of Claims 1 to 7. It is characterized in that the edges are provided as elements of massive material on mutually facing faces of the scissor blades which are formed by weld application of a hard metal and subsequent grinding step, and extend over the entire thickness of the scissor blades.

The barber scissors of the invention are thus characterized by excellent cutting properties at high resistance against mechanical strains, long life, and particularly also by the ability of permanently remaining sharp even at an acute cutting angle, and where necessary also by the ability of readily being resharpen. Further advantages of the barber scissors of the invention result from the aspects discussed in the preceding with regard to the method.

This particularly also applies to the developments according to which the insides of the scissor blades and of the edges are fine-ground and/or matted, to thus improve easy movement of the barber scissors and/or their corrosion resistance.

Furthermore in practical experiments a hard metal material was found to be particularly advantageous which consists of a cobalt-based alloy. Particularly good results were obtained in tests with an alloy including 30% of Cr, 12% of W, 2.5% of C, and the remainder Co (Stellite 1), which has a hardness HRC of 51 to 58. With this material the advantageous properties of the barber scissors of the invention may be optimized particularly well.

The invention shall in the following be explained in more detail by way of practical examples by referring to the figures of the drawing, wherein.

Figure 1:
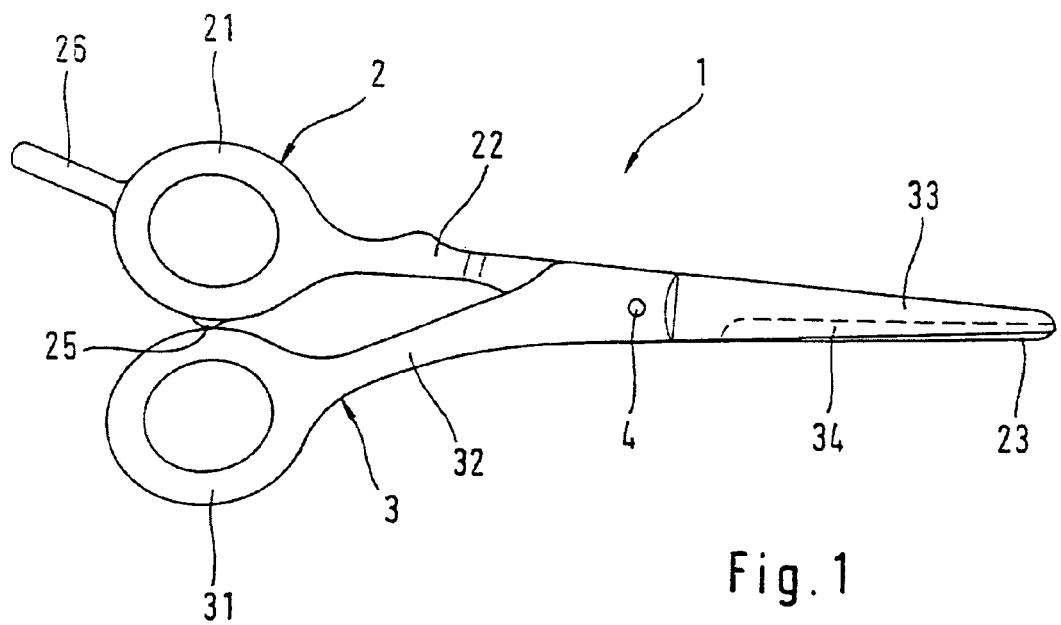
FIG. 1 shows barber scissors of the invention in the closed condition.
Figure 2:
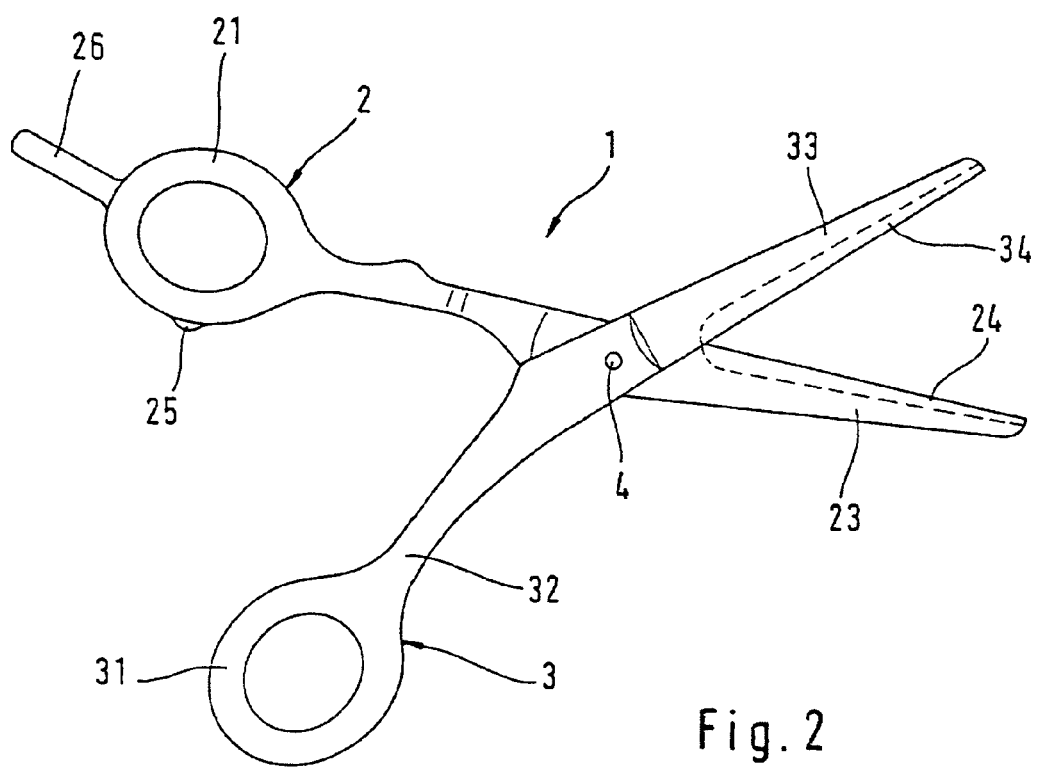
FIG. 2 shows the barber scissors of the invention in the opened condition.

In accordance with the representations in FIGS. 1 and 2, barber scissors 1 comprise two scissor halves 2 and 3 pivotally coupled to each other through the intermediary of a lock 4. The scissor half 2 includes a ring 21, a shank 22, a scissor blade 23, and an edge 24. In addition a blade stop 25 as well as a finger support 26 are furthermore arranged on the ring 21. The scissor half 3 includes a ring 31, a shank 32, a scissor blade 33, and an edge 34.

The manufacturing method for the barber scissors 1 shall in the following be explained by referring to FIGS. 3A to 3C by the example of scissor half 2, with the method for scissor half 3 unfolding analogously.

Initially the two scissor halves 2 and 3 are furnished and processed in a traditional manner known per se. Thus in particular even at the beginning of processing, a grinding and polishing of the inner face of the rings 21 and 31, and a formation of the bores in the two scissor halves 2 and 3 while cutting a thread and countersinking the screw hole on the matching part for the lock 4 having the form of a bolt are performed. This is followed by the actual steps of forming the edges 24 and 34.

Figure 3A:
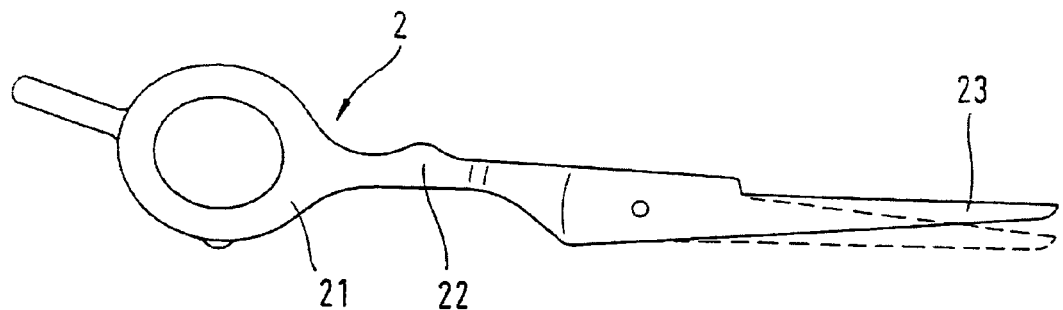
FIGS. 3A to 3C show manufacturing steps by the example of one scissor half.

In accordance with the representation in FIG. 3A, at first a blank for the scissor half 2 is furnished. The scissor blade 23 is left in the range intended for formation of the edge 24. Then the scissor blade 23 is shaped such that it is curved away from the edge approximately into the position indicated by a dashed line in FIG. 3A. The degree of this preliminary curvature was determined in preliminary testing and corresponds to a degree of deformation of the scissor blade owing to the influence of heat during the subsequent welding process.

Figure 3B:
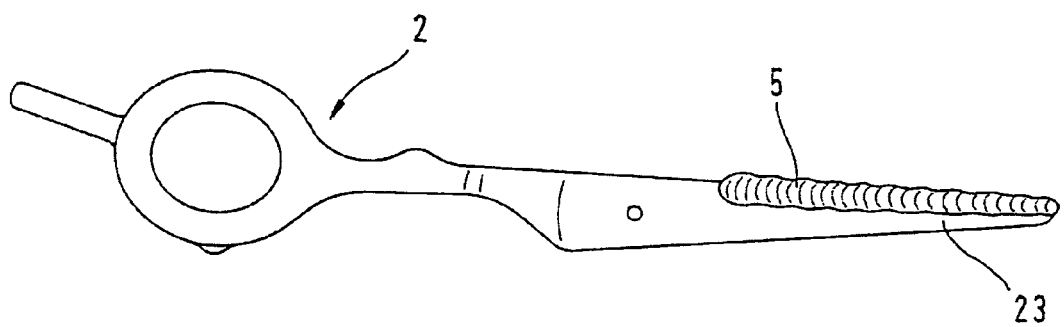
Figure 3C:
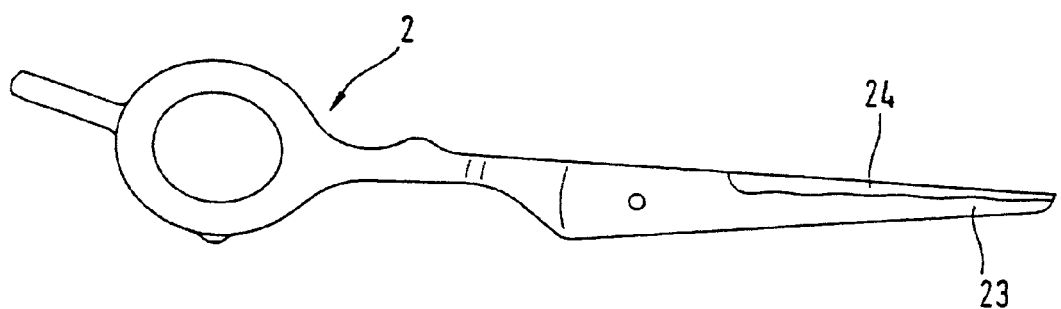

In accordance with the representation in FIG. 3B, a hard metal material is then applied in the form of a welding bead 5 on the associated face of the scissor blade 23 by a TIG welding process. From this welding bead 5 the edge 24 will later on be formed by a grinding step. The adjacent surfaces of the scissor blade 23 and of the edge 24 are ground jointly, resulting in an aligned transition. This is of particular importance on the inside of scissor blade 23 facing scissor blade 24, for these surfaces can slide on each other. The width of the edge 24 in the top view of the barber scissors 1 is on the average about half the width of scissor blade 23.

In the scissor half 2 thus produced, the scissor blade 23 and the edge 24 are thus intimately connected, with the softer material of the scissor blade 23 permitting accurate setting of the barber scissors 1 in the assembled condition, and wherein the good wear resistance of the hard metal material of the edge 24 provides for a long service life with permanently good cutting properties.

For the purpose of setting, the two scissor halves 2 and 3 are screwed together and connected and then set jointly. The setting step particularly concerns movement and shape of the edges 24 and 34 and of the scissor blades 23 and 33, as well as the rings 21 and 31 and the branches. Here the rings are also bent into the desired shape and a desired angle of inclination with the main plane of the scissors so that these lie well in the hand. Finally the scissor halves 2 and 3 are provided with numbering in order to ensure their association, following by global pre-grinding of the shape on the barber scissors 1. Hereupon the scissor halves 2 and 3 are again taken apart and washed in an ultrasonic bath at approx. 80° C., and subsequently rinsed with water.

After this, the scissor halves 2 and 3 are hardened. This is followed by polishing the insides of the scissor blades 23 and 33 on a cork disc with polishing paste, as well as the lock on the two scissor halves 2 and 3. These are then in turn connected with each other and subsequently hard-setting is performed. Here the running surface is polished, and the shape is optimized particularly with a view to the relative position of the two scissor blades 23 and 33, and to the position of the rings 21 and 31. Subsequently the scissors are pre-ground entirely and afterwards polished, for which purpose a grain size 400 or 600 is used.

In a subsequent step, the two scissor halves 2 and 3 are then again taken apart and once more surface-treated by brushing with the aid of a brush disc and brushing powder. This is followed by a cleaning step of the parts. Then the scissor halves 2 and 3 are finished with the aid of a wobble disc and finishing paste, and the insides of the scissor blades 23 and 33 are matted. As a result of these finishing steps, the surfaces are homogenized and given an optically appealing appearance.

This is followed by a renewed cleaning step of the scissor halves 2 and 3 and renewed combination of the latter in accordance with the associated numbers on the parts. Subsequently setting of the barber scissors 1 is completed, the bolt serving as the lock 4 is appropriately tightened such that the shank of the bolt bites into the thread to be permanently fixed, and the running surface is set. Afterwards, where necessary, renewed grinding and polishing of the hard metal edges 24 and 34 as well as cleaning of the parts are performed.

In the present embodiment, this is followed by a step of gold-plating parts of the barber scissors 1, with the gold locations being covered with adhesive tape or the like, the bolt is polished and ground with a felt wheel, and the bolt and scissor halves 2 and 3 are subjected to the gold-plating after another cleaning step.

After this the blade stop 25 and the finger support 26 are applied, and a renewed movement check as well as optionally re-grinding of the edges 24 and 34 are performed. This is followed by a cutting check and a quality test of the entire product, which is subsequently oiled so as to prevent corrosion; the scissors are then wiped, packaged, and readied for shipping.

Apart from the explained embodiment, the invention allows for further configuration approaches.

Thus the barber scissors 1 of the invention may in the screwed-together condition at first be pre-set in a conventional manner with a hammer so as to establish a certain degree of advantageous accuracy of movement and precision.

Furthermore the step of grinding the scissor blades 23 and 33 and the edges 24 and 34 may be followed by fine-grinding in one step or in several steps. In this fine-grinding step, the mutually facing insides of the scissor blades 23 and 33 and of the edges 24 and 34 are post-processed on a cork disc having a thickness, e.g., of 20 mm, at 1200 rpm while using a special, very fine polishing powder.

Apart from this, the insides of the scissor blades and of the edges may in a further method step be matted with the aid of a Scotch disc so as to remove any minor grinding traces possibly still existing even after the fine grinding and polishing steps while removing them to such a degree that they will not impair a smooth movement of the scissors any more.

It is also advantageously possible with the method in accordance with the invention to include the range of the scissor halves 2 and 3 around the lock 4, in which these slide on each other and guide each other, in the grinding and/or matting steps provided in the method of the invention.

Besides the TIG welding process as explained, it is also possible to employ other welding processes for applying the welding bead of hard metal material, wherein an inert gas welding process such as TP, MIG, or MAG welding is preferred. Moreover it is also possible to perform hard-plating with the hard metal material by using a cooled clamping device.

A material that was found to be suitable in testing for the hard metal is in particular a cobalt-based alloy. Advantageously, stellites are used for this purpose, with hard metal having a hardness HRC in the range of 50 to 60 being particularly suitable. Thus it is possible, besides Stellite 1, to also use Stellite 4 H or Stellite 190 etc., for instance. Apart from this it is, however, also possible to use any other hard metals having equivalent properties.

The invention claimed is:

1. A method for manufacturing barber scissors wherein edges of hard metal are arranged on the scissor blades, comprising the steps:
    furnishing one blank each for scissor halves of the barber scissors, with the scissor halves each comprising a scissor blade, a shank, and a ring,
    pre-shaping the scissor blades by a predetermined degree of curvature in the direction facing away from the edge,
    welding on a hard metal material in the form of a welding bead on the respective mutually facing faces of the scissor blades in order to form the hard metal layers for the edges, wherein the predetermined pre-forming of the scissor blades is substantially neutralized owing to the influence of heat during the welding process,
    grinding of the welding beads so as to form the edges,
    combining and subsequently setting the scissor halves,
    disassembly and subsequent hardening of the scissor halves,
    surface treatment of the scissor halves,
    again combining the scissor halves, and
    hard-setting the barber scissors.

2. The method in accordance with claim 1, characterized in that prior to pre-forming of the scissor blades, a removal of material is performed on the scissor blades on their mutually facing faces on which the edges are to be formed.

3. The method in accordance with claim 1, characterized in that welding on of the hard metal material is performed with a TIG welding process.

4. The method in accordance with claim 1, characterized in that welding on of the hard metal material is performed with the aid of a cooled clamping device.

5. The method in accordance with claim 1, characterized in that hard-setting of the barber scissors includes pre-setting by mean of hammer blows.

6. The method in accordance with claim 1, characterized in that the surface treatment of the scissor halves includes a fine-grinding in one step or in several steps, wherein the insides of the scissor blades and of the edges are worked on a cork disc by using a polishing paste.

7. The method in accordance with claim 1, characterized in that the surface treatment of the scissor halves includes matting of the insides of the scissor blades and of the edges.

* * * * *